United States Patent [19]

Schoer et al.

[11] 3,900,151

[45] *Aug. 19, 1975

[54] JOINING PROCESS

[75] Inventors: Heinz Schoer, Alfter; Werner Schultze, Bonn, both of Germany

[73] Assignee: Vereinigte Aluminium-Werke Aktiengesellschaft, Bonn, Germany

[ * ] Notice: The portion of the term of this patent subsequent to Apr. 30, 1991, has been disclaimed.

[22] Filed: Dec. 4, 1973

[21] Appl. No.: 421,655

Related U.S. Application Data

[60] Division of Ser. No. 285,099, Aug. 29, 1972, Pat. No. 3,807,033, which is a continuation-in-part of Ser. No. 98,173, Dec. 14, 1970, abandoned.

[30] Foreign Application Priority Data

Sept. 2, 1971 Germany.......................... 2143966

[52] U.S. Cl. ............... 228/220; 75/178 A; 228/263
[51] Int. Cl. ..................... B23k 35/28; B23k 35/38
[58] Field of Search.......... 75/178 A, 178 R, 175 A, 75/175 R, 175 AC, 175 AT, 175 AM, 175 AN, 178 A; 29/494, 504

[56] References Cited
UNITED STATES PATENTS

| 722,273 | 3/1903 | Neild et al. ..................... 75/178 A |
| 1,612,151 | 12/1926 | Richardson ..................... 75/178 A |
| 2,733,168 | 1/1956 | Hodge et al. ..................... 29/503 X |
| 3,370,343 | 2/1968 | Martin ................................. 29/494 |
| 3,457,630 | 7/1969 | Schwartz et al. ..................... 29/494 |
| 3,480,465 | 11/1969 | Inabayashi et al. ............. 117/114 A |
| 3,482,305 | 12/1969 | Dockus et al. ..................... 29/494 X |
| 3,733,687 | 5/1973 | Tanoka et al. ............. 75/178 AM X |
| 3,807,033 | 4/1974 | Schoer et al. ..................... 29/504 X |
| 3,811,177 | 5/1974 | Schoer et al. ..................... 29/504 X |

FOREIGN PATENTS OR APPLICATIONS

| 1,139,399 | 6/1957 | France .............................. 75/178 A |
| 625,538 | 9/1961 | Italy .................................. 75/178 A |
| 24,209 | 12/1961 | Japan .................................. 29/504 |

OTHER PUBLICATIONS

Abstract of Application Serial No. 740,715, published 7/49.

Welding Handbook, Section 4, 5th Edition, published in 1966 by American Welding Society, pp. 69.120–69.126, Technical library.

*Primary Examiner*—Ronald J. Shore
*Attorney, Agent, or Firm*—Michael S. Striker

[57] ABSTRACT

A process for the fluxless soldering of aluminumcontaining workpieces in substantially non-oxidizing atmospheres is carried out with a solder which contains 2-26% by weight of Al and at least one additive from the group consisting of Bi, Sr, Ba, Sb and Be, the balance being Zn. The additives Bi, Sr, Ba and Sb constitute 0.01–10 percent by weight and the additive Be constitutes 0.00001–1.0 percent by weight of the solder. These additives lower the viscosity and surface tension of the molten solder and also decrease the interfacial tension between the molten solder and the workpieces.

8 Claims, No Drawings

3900,151 …

JOINING PROCESS

CROSS-REFERENCE TO RELATED APPLICATIONS

This application is a division of our copending application Serial No. 285,099 filed Aug. 29, 1972 and entitled "Joining Process", now patent 3,807,033, Apr. 30, 1974, which, in turn, is a continuation-in-part of our application Serial No. 98,173 filed Dec. 14, 1970 and entitled "Process and Solder for Soldering Aluminum-containing Workpieces", now abandoned.

BACKGROUND OF THE INVENTION

An intrinsic problem exists in the soldering of aluminum or aluminum alloy workpieces as a result of the very cohesive, ever present oxide film on the surfaces of these workpieces. The problem lies in the fact that the oxide film prevents the surfaces of the workpieces from being adequately wetted by the molten solder. Although the oxide film is very thin, it is, however, impervious and stable and reforms spontaneously after being removed, for example, by corrosive means. Furthermore, the oxide film is strengthened during the soldering processes inasmuch as these processes are carried out in oxidizing atmospheres such as air, for example. Thus, aside from the special methods of friction and ultrasonic soldering, it has, until now, been necessary in the soldering of aluminum to remove the oxide film from the area of the joint by using fluxes. In addition, the area to be soldered has to be protected in order to prevent renewed oxidation. The fluxes used are composed, in part, of metallic salts such as, for example, zinc salts, which cause metallic deposition to occur in the area of the joint and which, as a consequence, lead to an improvement in the wetting characteristics of the solder.

Fluxes suitable for the soldering of aluminum generally contain chlorides or fluorides and, for the purpose of soft soldering, may also contain pure organic compounds. However, all fluxes possess the disadvantage of being corrosive, most of them extremely so, and, as a result, their residues must be removed after soldering. In addition, there is the danger of the flux being incorporated into the soldered joint. The incorporated flux and the flux residues greatly impair the corrosion resistance of the soldered article especially when moisture comes into contact with the soldered joint. The removal of the flux residues is expensive and, additionally, is usually incomplete.

A solder for aluminum and aluminum alloys is already known from German Pat. No. 896,444 issued in 1941. This solder is composed of high-grade zinc and high-purity aluminum and may contain, in addition to other alloying elments, up to 1% Sb and/or up to 1% Bi. However, the state of the art at that time was such, that the use of a flux in conjunction with such solders was considered indispensable. This is also shown by British Pat. No. 747,813 issued in 1951–1952. In the latter patent it is indicated that the use of zinc-aluminum solders requires the simultaneous utilization of special fluxes containing metallic salt additions.

It is clear from the above that fluxless and brazing heretofore considered impossible, would provide great technical and economic advantages.

SUMMARY OF THE INVENTION

It is, accordingly, an object of the present invention to overcome the disadvantages of the prior art.

More particularly, it is an object of the present invention to provide a process for the joining of aluminum or aluminum alloys which does not possess the above disadvantages.

A more specific object of the present invention is to provide a process for the fluxless joining of aluminum or aluminum alloys.

Another object of the present invention is to provide a process for the fluxless joining in an at least substantially non-oxidizing atmosphere of aluminum or aluminum alloys.

Some of the novel features of the present invention thus reside in a process for the fluxless joining of aluminum-containing workpieces in substantially non-oxidizing atmospheres. The process is carried out with a filler metal which contains 2–45% by weight of Al and at least one of the additives from the group consisting of Bi, Sr, Ba, Sb and Be, the balance being Zn. The additives Bi, Sr, Ba and Sb constitute 0.01–10 percent by weight and the additive Be constitutes 0.00001–1.0 percent by weight of the solder. These additives lower the viscosity and surface tension of the molten filler metal and also decrease the interfacial tension between filler metal and the workpieces.

The present invention thus provides a material consisting primarily of Zn and containing additions of Bi, and/or Sr, and/or Ba, and/or Sb, and/or Be, as well as Al. The Bi, Sr, Ba and Sb additions constitute 0.01–10 percent by weight of the material and are preferably present in amounts of 0.05–2.0 percent by weight. On the other hand, the Be addition constitutes 0.00001–1.0 percent by weight of the material and is preferably present in amounts of 0.0002–0.1% by weight. The substance of the invention lies in the use of this material as a filler metal for the joining of aluminum-containing workpieces in non-oxidizing atmospheres or in an atmosphere wherein the oxygen content in the vicinity of the area to be soldered is low.

No special precautions beyond those normally used in joining processes are necessary for the fluxless joining of aluminum when utilizing the solder provided by the present invention.

DESCRIPTION OF THE PREFERRED EMBODIMENTS

Tests have shown that filler metals according to the present invention are, surprisingly, suitable for the fluxless joining of aluminum when a non-oxidizing atmosphere or an atmosphere of low oxygen content is provided about the area to be joined. An inert protective gas for joining such as, for example, welding grade argon, commercial quality nitrogen, forming gas or ammonia, may be used for providing the non-oxidizing atmosphere. A low vacuum of, say, $10^{-1}$ to 10 torr may also be used for this purpose.

These tests have also surprisingly shown that the incorporation of the above-mentioned additions in the filler metal not only lowers the viscosity and surface tension of the molten filler metal but, simultaneously, substantially reduces the interfacial tension between the molten filler metal and the workpieces. As a result, the wetting characteristics of the filler metal are significantly improved.

A distinction can be made between soft zinc aluminum solders, i.e. solders, and hard zinc-aluminum solders, i.e. brazing alloys, on the basis of composition and, as a consequence, on the basis of joining temperature. Filler metals in accordance with the present invention containing the above-mentioned additions and substantially 2–26 percent by weight of Al with the balance being Zn are classified as soft solders or solders. On the other hand, filler metals according to the present invention containing the above-mentioned additions with 26–45% by weight of Al and, if required, an additional alloy constituent of up to 1 percent by weight of Mn with the remainder being Zn, are classified as hard solders or brazing alloys. These filler metals can be utilized in all conventional forms such as, for example, wires, bars, formed shapes, foils, solder-plated sheets etc.

The following are examples of filler metals compositions in accordance with the present invention.

| Example 1 | | Example 2 | |
|---|---|---|---|
| Element | % by weight | Element | % by weight |
| Zn | 94.80 | Zn | 95.19 |
| Al | 4.18 | Al | 4.55 |
| Be | 0.06 | Bi | 0.16 |
| Mn | 0.86 | Be | 0.02 |
| Impurities | 0.10 | Impurities | 0.08 |

| Example 3 | | Example 4 | |
|---|---|---|---|
| Element | % by weight | Element | % by weight |
| Zn | 67.15 | Zn | 59.63 |
| Al | 32.73 | Al | 39.88 |
| Be | 0.09 | Bi | 0.08 |
| Impurities | 0.03 | Be | 0.01 |
| | | Mn | 0.37 |
| | | Impurities | 0.05 |

The above examples are in no way intended to limit the scope of the present invention but serve merely to illustrate the preferred embodiments. The filler metal compositions may be varied as necessary to suit particular requirements.

The joining tests were carried out in an electrically heated oven. Pure aluminum and aluminum-manganese sheets were used in conjunction with filler metals having compositions as outlined in the above examples. These tests, which in accordance with the present invention were performed without a flux, were carried out in a protective gas atmosphere such as, for example, argon and nitrogen. For filler metals having compositions as in examples 1 and 2 (solders), the soldering temperature was between 400° and 415°C whereas for filler metals having compositions as in examples 3 and 4 (brazing alloys), the brazing temperature was between 530° and 545°C. Joining times were of the order of two minutes. Satisfactory joints were produced in all of the above tests.

In contrast, the commercial zinc-aluminum 4 solder without the above-mentioned additions did not produce a joint when no flux was used.

It will be understood that each of the elements described above, or two or more together, may also find a useful application in other types of joining methods differing from the types described above.

While the invention has been illustrated and described as embodied in filler metal for the fluxless joining of aluminum-containing workpieces in a substantially non-oxidizing atmosphere, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims:

1. In a process of soldering aluminum-containing workpieces, the step of soldering said workpieces with a Zn base solder comprising 2–26% by weight of Al, and Be as a wetting agent, said Be lowering the viscosity and surface tension of said solder in its molten state and substantially decreasing the interfacial tension between the molten solder and said workpieces, and said step being performed without a flux and in a substantially non-oxidizing atmosphere.

2. In a process as defined in claim 1, wherein said solder comprises 0.00001–1.0 percent by weight of said Be.

3. In a process as defined in claim 2, wherein said solder comprises 0.002–0.1 percent by weight of said Be.

4. In a process as defined in claim 1, wherein said solder further comprises at least one substance selected from the group consisting of Bi, Sr, Ba and Sb as an additional wetting agent, said Bi, Sr, Ba and Sb lowering the viscosity and surface tension of said solder in its molten state and substantially decreasing the interfacial tension between the molten solder and said workpieces.

5. In a process as defined in claim 4, wherein said solder comprises 0.01–10 percent by weight of said substance.

6. In a process as defined in claim 5, wherein said solder comprises 0.05–2 percent by weight of said substance.

7. In a process as defined in claim 4, wherein said solder comprises 0.00001–1.0 percent by weight of said Be.

8. In a process as defined in claim 7, wherein said solder comprises 0.002–0.1 percent by weight of said Be.

* * * * *